(12) United States Patent
Kumar

(10) Patent No.: US 11,351,847 B2
(45) Date of Patent: Jun. 7, 2022

(54) CLIPLESS HOOD SEAL

(71) Applicant: Toyota Motor Engineering & Manufacturing North America, Inc., Plano, TX (US)

(72) Inventor: Praveen Kumar, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 63 days.

(21) Appl. No.: 16/836,225

(22) Filed: Mar. 31, 2020

(65) Prior Publication Data

US 2021/0300164 A1    Sep. 30, 2021

(51) Int. Cl.
*E06B 7/22* (2006.01)
*B60J 10/23* (2016.01)
*B60J 10/40* (2016.01)
*B60J 10/248* (2016.01)

(52) U.S. Cl.
CPC ............ *B60J 10/23* (2016.02); *B60J 10/248* (2016.02); *B60J 10/40* (2016.02)

(58) Field of Classification Search
CPC ........... B60J 10/23; B60J 10/40; B60J 10/248
USPC ....................... 49/498.1, 480.1, 490.1, 493.1
See application file for complete search history.

(56) References Cited

U.S. PATENT DOCUMENTS

| 1,998,791 A | | 4/1935 | Schanz | |
|---|---|---|---|---|
| 3,145,434 A | * | 8/1964 | Major | B60J 10/30 49/490.1 |
| 4,819,381 A | * | 4/1989 | Kitaura | B60J 10/79 49/493.1 |
| 4,858,385 A | * | 8/1989 | Bright | B60J 10/24 49/490.1 |
| 5,207,029 A | * | 5/1993 | Nozaki | B60J 10/248 49/490.1 |
| 5,361,542 A | * | 11/1994 | Dettloff | E06B 7/2318 49/477.1 |
| 5,916,076 A | * | 6/1999 | Cittadini | F25D 23/087 49/492.1 |
| 6,007,140 A | * | 12/1999 | Heitmann | B60J 10/24 296/146.9 |
| 6,820,372 B2 | * | 11/2004 | Nozaki | B60J 10/24 49/492.1 |

(Continued)

FOREIGN PATENT DOCUMENTS

| DE | 102006060391 A1 | * | 6/2008 | ............. B60J 10/36 |
|---|---|---|---|---|
| DE | 102017112720 A1 | * | 12/2018 | ............. B60J 10/88 |

(Continued)

*Primary Examiner* — Jerry E Redman
(74) *Attorney, Agent, or Firm* — Christopher G. Darrow; Darrow Mustafa PC

(57) ABSTRACT

A seal includes a base portion, a first retaining member extending from the base portion, and a second retaining member extending from the base portion. Each of the first and second retaining members is structured to be resiliently deflectable with respect to the base portion. A portion of the first retaining member extends opposite the base portion so as to define a first cavity therebetween. A portion of the second retaining member extends opposite the base portion so as to define a second cavity therebetween. The first cavity has an open side opening in a first direction toward the second cavity, and the second cavity has an open side opening in a second direction toward the first cavity.

7 Claims, 3 Drawing Sheets

(56) References Cited

U.S. PATENT DOCUMENTS

| | | | | |
|---|---|---|---|---|
| 7,059,611 B2* | 6/2006 | Ahlers | ................ | B60J 10/24 |
| | | | | 277/628 |
| 7,418,994 B2 | 9/2008 | Evans et al. | | |
| 8,991,102 B2* | 3/2015 | Minagawa | ............. | B60J 10/86 |
| | | | | 49/479.1 |
| 9,038,319 B2* | 5/2015 | Kuwabara | .............. | B60J 10/20 |
| | | | | 49/498.1 |
| 9,676,261 B2* | 6/2017 | Krueger | ............... | E06B 7/2305 |
| 10,112,468 B2* | 10/2018 | Miyata | ................ | B60J 10/88 |
| 2002/0027378 A1* | 3/2002 | Nozaki | ................ | B60J 10/30 |
| | | | | 296/146.9 |
| 2002/0136850 A1* | 9/2002 | Ikuta | ................ | B60J 10/84 |
| | | | | 428/36.9 |
| 2002/0178656 A1* | 12/2002 | Nozaki | ............. | B60J 10/2335 |
| | | | | 49/441 |
| 2004/0051427 A1* | 3/2004 | Cittadini | ............... | F25D 23/082 |
| | | | | 312/296 |
| 2005/0076575 A1* | 4/2005 | Cittadini | ............... | F25D 23/087 |
| | | | | 49/498.1 |
| 2007/0024084 A1* | 2/2007 | Oba | ................. | B60J 10/40 |
| | | | | 296/146.9 |
| 2007/0180776 A1* | 8/2007 | Oba | ................. | B60J 10/35 |
| | | | | 49/498.1 |
| 2007/0245634 A1* | 10/2007 | Oba | ................. | B60J 10/16 |
| | | | | 49/498.1 |
| 2009/0056229 A1* | 3/2009 | Mugishima | .............. | B60J 10/21 |
| | | | | 49/493.1 |
| 2009/0183435 A1* | 7/2009 | Daio | ................. | B60J 10/36 |
| | | | | 49/493.1 |
| 2013/0067821 A1* | 3/2013 | Otsuka | ................. | B60J 10/248 |
| | | | | 49/490.1 |
| 2014/0049067 A1* | 2/2014 | Kasuya | ................. | B60J 10/86 |
| | | | | 296/146.5 |
| 2017/0240035 A1* | 8/2017 | Allali | ................. | B60J 10/90 |
| 2017/0259659 A1* | 9/2017 | Kojima | ................. | B60J 10/277 |
| 2018/0178640 A1* | 6/2018 | Nagai | ................. | E06B 7/2305 |

FOREIGN PATENT DOCUMENTS

| | | |
|---|---|---|
| JP | H07223556 A | 8/1995 |
| JP | 2005186908 A | 7/2005 |
| JP | 2011025787 A | 2/2011 |
| JP | 2011046249 A | 3/2011 |
| KR | 100402852 B1 | 10/2003 |
| KR | 20160076624 A | 7/2016 |

* cited by examiner

CLIPLESS HOOD SEAL

TECHNICAL FIELD

The present invention relates to flexible or resilient seals and, more particularly, to a resilient seal mountable on a vehicle structure to seal a seam between a vehicle grille molding and the vehicle hood.

BACKGROUND

Flexible seals may be used to help prevent aerodynamic noise due to air entering a vehicle engine compartment between the vehicle hood and grille. However, mounting of such seals to the vehicle may involve complicated attachment schemes including clips, fasteners and/or other parts separate from the seal.

SUMMARY

In one aspect of the embodiments described herein, a seal includes a base portion, a first retaining member extending from the base portion, and a second retaining member extending from the base portion. Each of the first and second retaining members is structured to be resiliently deflectable with respect to the base portion. A portion of the first retaining member extends opposite the base portion so as to define a first cavity therebetween. A portion of the second retaining member extends opposite the base portion so as to define a second cavity therebetween. The first cavity has an open side opening in a first direction toward the second cavity, and the second cavity has an open side opening in a second direction toward the first cavity.

In another aspect of the embodiments described herein, a seal includes a base portion, a first retaining member extending from the base portion and formed integrally with the base portion, and a second retaining member extending from the base portion and formed integrally with the base portion. Each of the first and second retaining members is structured to be resiliently deflectable with respect to the base portion. The base portion is formed from a material having a first hardness. At least a portion of the first retaining member is formed from a material having a second hardness lower than the first hardness. At least a portion of the second retaining member is formed from a material having a third hardness lower than the first hardness.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
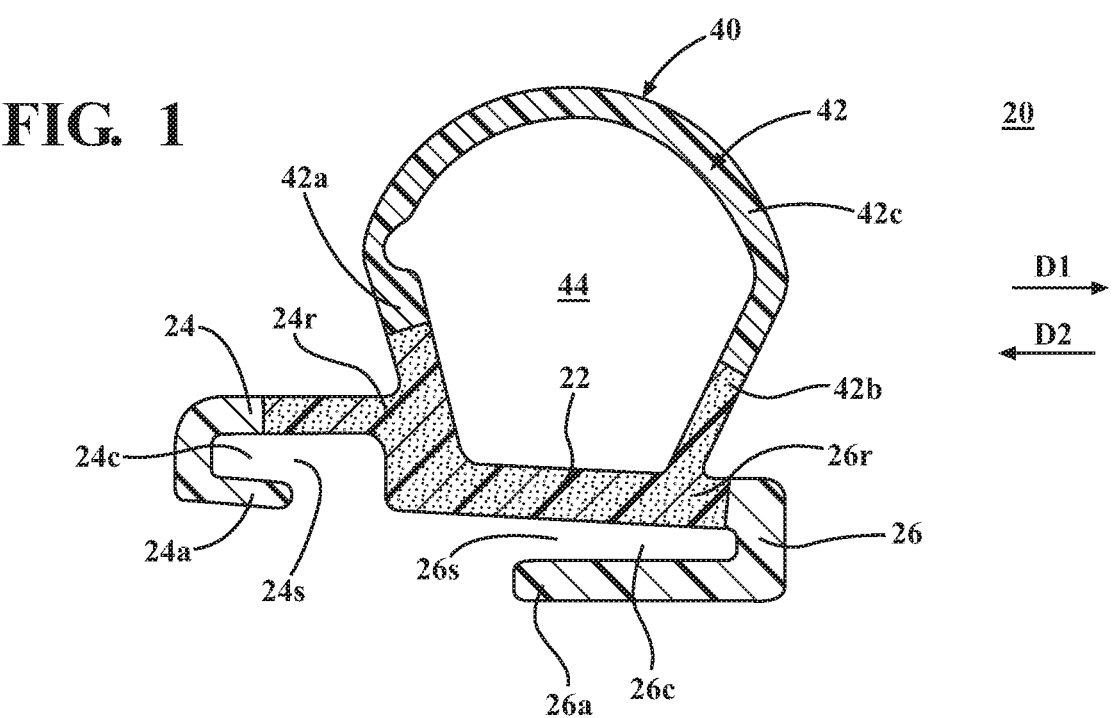
FIG. 1 is a side cross-sectional view of a seal mountable on a vehicle to seal a gap between a vehicle grille molding and the vehicle hood.

Embodiments described herein relate to a resilient seal mountable on a vehicle to seal a seam between a vehicle grille molding and the vehicle hood. In one aspect, the seal may include a base portion, a first retaining member extending from the base portion, and a second retaining member extending from the base portion. Each of the first and second retaining members is structured to be resiliently deflectable with respect to the base portion. A portion of the first retaining member extends opposite the base portion so as to define a first cavity therebetween. A portion of the second retaining member extends opposite the base portion so as to define a second cavity therebetween. The first cavity has an open side opening in a first direction toward the second cavity, and the second cavity has an open side opening in a second direction toward the first cavity. The first and second cavities are structured to receive portions of a grille reinforcement therein, to enable mounting of the seal onto the grille reinforcement. The seal may be "zipped" onto the grille reinforcement to attach the seal to the grille reinforcement, by pressing the seal base portion onto the grille reinforcement and resiliently deflecting/manipulating the retaining members so as to position portions of the grille reinforcement inside the first and second cavities. In particular embodiments, the seal base portion may be stiffened to prevent deformation of the base portion during mounting of the seal. The stiffening may be achieved by forming the base portion from a stiffer (i.e., higher hardness) material than the material from which the first and second retaining members are formed.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments. Any of the components described herein may be formed from a material (or materials) suitable for the purpose(s) of the element as described herein.

Figure 2A:
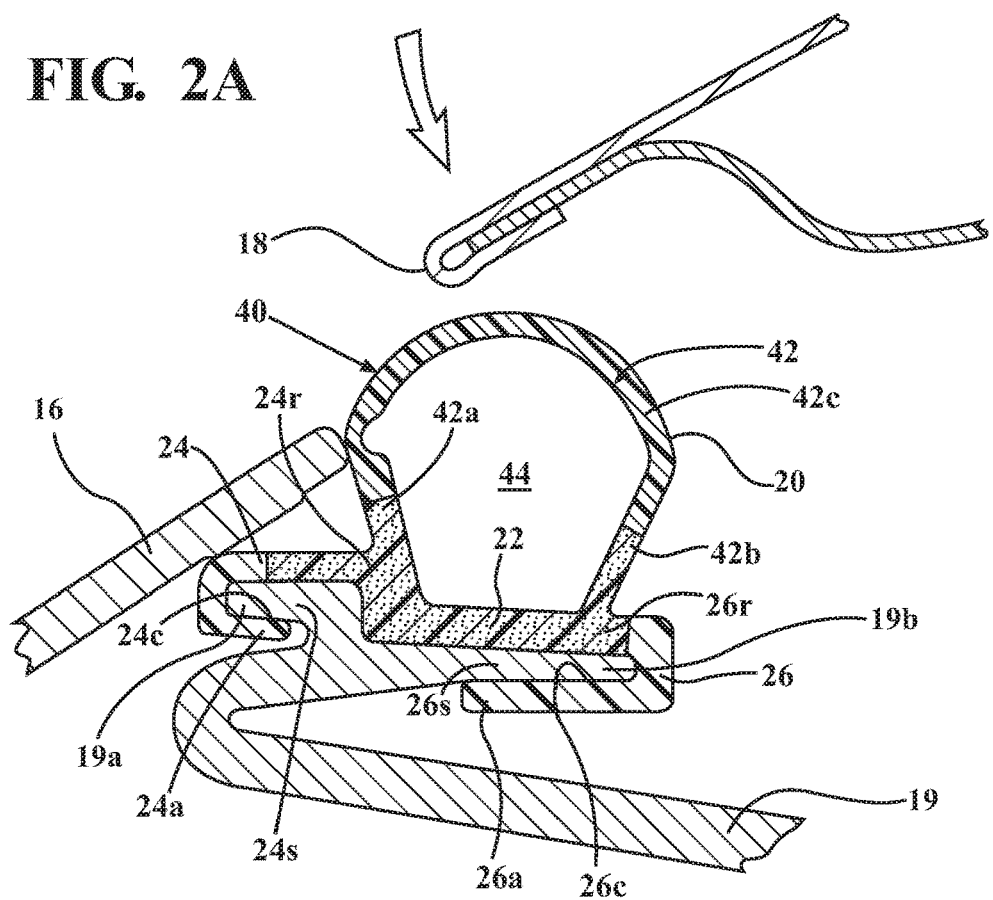
FIG. 2A is a side cross-sectional view of the seal of FIG. 1 showing the seal mounted on a vehicle so as to be positioned between the grille molding and the hood, and with the sealing portion wall in an undeformed condition.
Figure 2B:
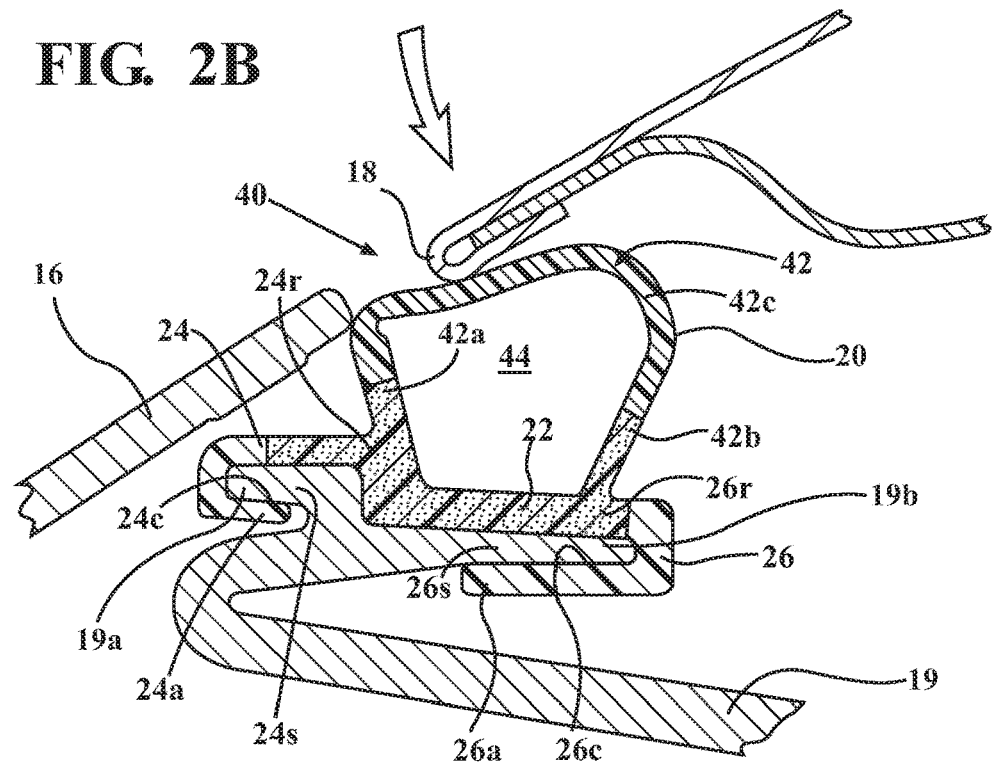
FIG. 2B is the side cross-sectional view of FIG. 2A showing the seal in a deformed condition with the vehicle hood pressing on the seal when the hood is closed.
Figure 3:
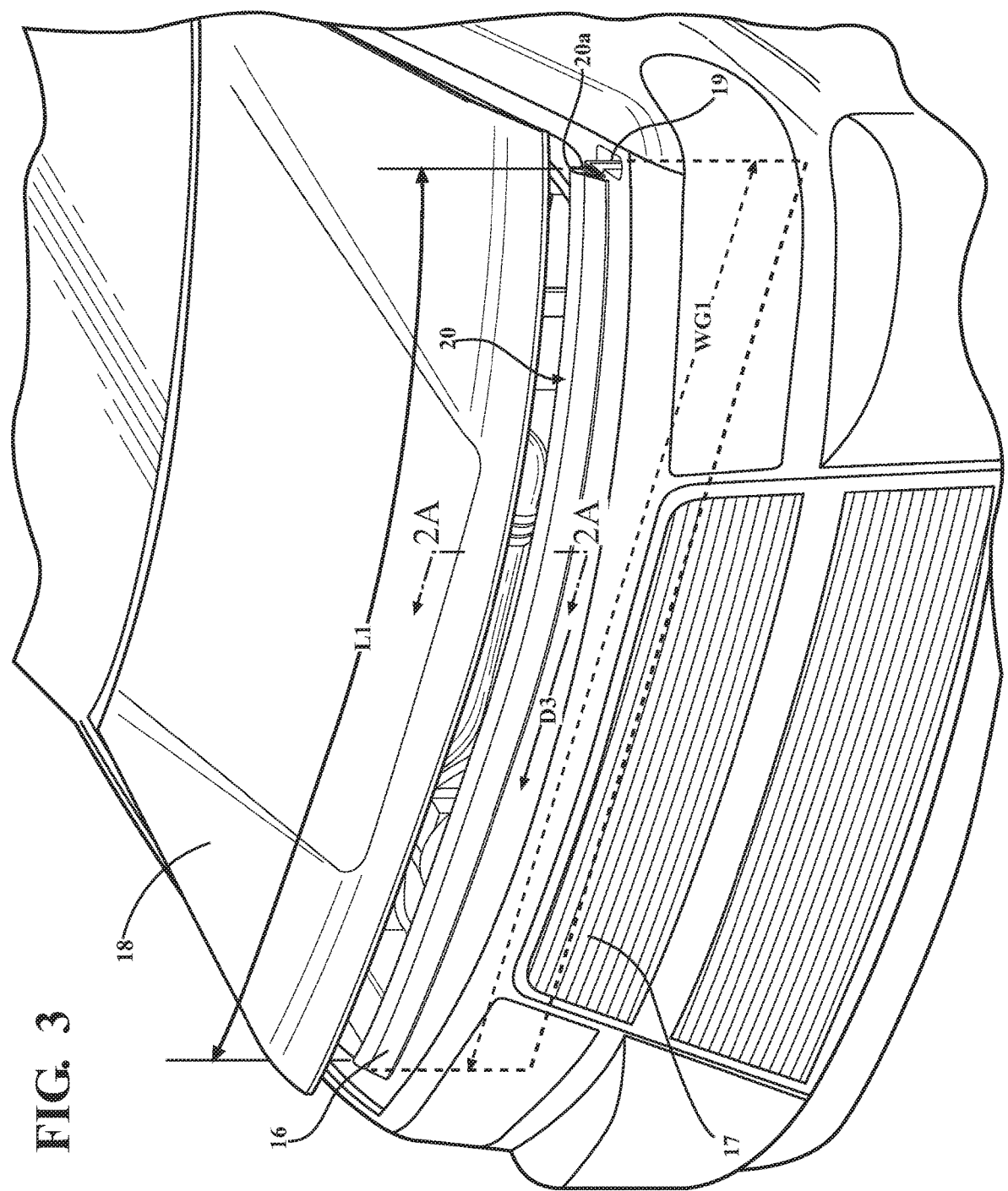
FIG. 3 is a front perspective view of a vehicle showing the seal of FIG. 1 mounted in the vehicle as shown in FIGS. 2A-2B.

Referring to FIGS. 1-3, in embodiments described herein, a seal 20 may include a base portion 22, a first retaining member 24 extending from the base portion 22, and a second retaining member 26 extending from the base portion 22. Each of the first and second retaining members 24, 26 may be structured to be resiliently deflectable with respect to the base portion 22. "Resiliently deflectable" means that at least a portion of each retaining member may be deflected from an undeflected state (shown in FIG. 1) with respect to the base portion 22 during mounting of the seal 20 onto a mounting structure, and that the deflected portion of each retaining member will tend to return to its undeflected state after mounting is completed.

An embodiment 20 of the seal described herein is shown (in FIGS. 2A-3) mounted on a mounting structure in the form of a grille reinforcement 19 positioned adjacent a grille 17 of a vehicle, and is positioned and structured so as to provide a seal between the grille molding 16 and a vehicle hood 18 when the hood is closed. Alternatively, an embodiment of the seal may be mounted to an underside of the vehicle hood 18 in a position to provide the seal when the hood 18 is closed.

In one or more arrangements, the first and/or second retaining members 24, 26 may be formed integrally with the base portion 22. Formation of the first and second retaining members 24, 26 integrally with the base portion 22 means that the structure of the seal 20 from the base portion 22 into and along the first and second retaining members 24, 26 is formed from a single, continuous, unbroken mass of material. Where the base portion and a retaining member are formed from materials having different harnesses as described herein, there may be a smooth transition from a material of a first hardness to a material with a different hardness, with no gaps between the materials. In certain arrangements, the first hardness material and the other material may form intermolecular bonds in the transition region. The hardnesses of the materials forming the seal 20 may be measured in any of a number of known ways. In one or more arrangements described herein, the hardnesses are measured in a known manner and expressed as Shore durometer values.

In one or more embodiments, as seen in FIGS. 1 and 2A, a portion 24a of the first retaining member 24 extends opposite another portion 24r of the first retaining member residing adjacent the base portion and also opposite the base portion 22 so as to define a first cavity 24c therebetween. Also, a portion 26a of the second retaining member 26 extends opposite the base portion 22 so as to define a second cavity 26c therebetween. In particular embodiments, the first cavity 24c may have a first open side 24s opening in a first direction D1 toward the second cavity 26c, and the second cavity 26c may have a second open side 26s opening in a second direction D2 toward the first cavity 24c. The first direction D1 toward the second cavity 26c may be a direction that would bring an object proceeding in the direction D1 closer to the second cavity 26c. The second direction D2 toward the first cavity 24c may be a direction that would bring an object proceeding in the second direction D2 closer to the first cavity 24c. As seen in FIG. 2A, when the seal is to be mounted on a grille reinforcement 19, first cavity 24c may be structured to receive therein a first portion 19a of the vehicle grille reinforcement 19, and the second cavity 26c may be structured to receive therein a second portion 19b of the vehicle grille reinforcement.

The seal 20 may be structured so that each of the first and second portions 19a, 19b of the grille reinforcement 19 forms an interference fit with the base portion 22 and a respective one of the retaining members 24, 26 when the portions 19a, 19b of the grille reinforcement 19 are positioned in the cavities 24c, 26c. These interference fits help retain the seal 20 in position on the grille reinforcement 19. As seen in FIG. 3 and in the manner described herein, the length L1 of the seal 20 may extend along a width WG1 of the grille reinforcement 19 and may provide a resilient seal between the grille molding 16 and the vehicle hood 18 when the hood is closed.

In embodiments described herein, the base portion 22 may be structured so as to prevent deformation of the base portion during resilient deflection of the first and/or second retaining members 24, 26 with respect to the base portion. Deformation of the base portion 22 may be defined as a change in shape of the base portion along any transverse cross-section of the base portion (i.e., a cross-section taken perpendicularly to the length dimension L1 of the seal) due to forces applied to the base portion 22, for example, through the first or second retaining members 24, 26 or the sealing portion 40 (described elsewhere herein). For example, if the base portion 22 is insufficiently rigid, the base portion 22 may tend to bend or fold along the plane of a cross-section as shown in FIG. 1 as forces are applied thereto. The base portion 22 may be configured (for example, by use of suitable materials and/or by structural design) so as to prevent such deformation of the base portion responsive to forces applied to the seal 20 during mounting of the seal to a grille reinforcement 19 or other mounting structure, and also responsive to forces experienced by the seal 20 during compression of the seal when a vehicle hood 18 is closed onto the seal. This structural stiffness of the base portion 22 may aid in retaining on the vehicle portions of the seal 20 already mounted to the vehicle during attachment (or "zipping" as described herein) of the remaining portions of the seal 20 to the vehicle, and may also provide a relatively rigid bearing surface against which the relatively resilient retaining members 24, 26 may press the portions of the mounting structure received in the cavities 24c and 26c. In particular embodiments, the seal 20 may be structured to be mountable on a portion of a vehicle, and the base portion 22 may be structured so as to prevent deformation of the base portion 22 during mounting of the seal 20 to the portion of the vehicle.

In one or more arrangements, to provide a relatively stiff base portion 22 while allowing the retaining members 24, 26 to resiliently deflect with respect to the base portion 22, the base portion 22 may be formed from a material having a first hardness, while at least a portion of the first retaining member 24 may be formed from a material having a second hardness lower than the first hardness. Similarly, at least a portion of the second retaining member 26 may be formed from a material having a third hardness lower than the first hardness. In one or more arrangements, the third hardness may be equal to the second hardness, within applicable tolerance limits. Any different materials used to form the base portion 22, the first retaining member 24, and second retaining member 26 may be selected for chemical and processing compatibility so that the structure of the seal 20 will not fail along a transition region between the relatively higher hardness material and the relatively lower hardness material, under stresses experienced by the seal 20 during installation and use.

In one or more arrangements, different grades (i.e., having different mechanical properties) of the same material may be used for the base portion 22, first retaining member 24, and second retaining member 26. The relatively lower hardness material(s) of the retaining members 24, 26 may be selected to enable the retaining members to resiliently deflect with respect to the relatively stiffer base portion 22 during mounting of the seal 20 to a mounting structure, so that a portion of the mounting structure can be inserted or received in the cavities 24c, 26c formed by the base portion 22 and the retaining members 24, 26. Suitable materials for the seal 20 include rubbers and polymeric compounds having the characteristics described herein. In one example, EPDM (ethylene propylene diene monomer) materials having suitable durometer values may be used to form associated portions of the seal. In particular examples, the Shore durometer value of the material forming the base portion 22 may be in the range of 70±5 A, and the Shore durometer value of the material forming the first retaining member 24 and/or second retaining member 26 may be in the range of 50±5 A.

In one or more arrangements, to stiffen one or more of the first and second retaining member(s) 24, 26, portions 24r, 26r of the first and/or second retaining members 24, 26 residing adjacent and extending from the base portion 22 may be formed from the same, relatively stiffer (i.e., relatively higher Shore durometer value) material as the base portion. Formation of portions 24r, 26r of the first and/or second retaining member(s) 24, 26 from "the same material" as the base portion 22 may be achieved by, for example, extruding the relatively higher Shore durometer value material into both the portion of an extrusion die forming the base portion 22 and portion(s) of the die forming the portions 24r, 26r of the first and/or second retaining members 24, 26 adjacent the base portion 22. That is, the relatively higher Shore durometer value material may be extruded from the portion of the tool forming the base portion 22 and also from parts of the tool forming the portions 24r, 26r of the first and/or second retaining members 24, 26 directly connected to the base portion 22. At the same time, a relatively lower Shore durometer value material may be extruded from the portions of the tool forming the remainder (or "free end") of each of the first retaining member 24 and the second retaining member 26.

The flexibility of the retaining member(s) 24, 26 may be adjusted or "tuned" according to the requirements of a particular seal application, by appropriate selection of materials and/or by varying the amount of each retaining member formed from the relatively stiffer base portion material. Thus, as a greater portion of the length of a retaining member is formed from the relatively stiffer base portion material, the overall stiffness of the retaining member may increase. This enables an increase in the gripping or retention force exerted by the retaining member(s) 24, 26 on portions of a mounting structure received in the first and second cavities 24c, 26c.

As seen in FIGS. 1-3, the seal base portion 22, first retaining member 24, and second retaining member 26 may extend along an entire length L1 of the seal 20. The structure described may retain the seal 20 on the grille reinforcement 19 along the entire length of the seal 20, without a need for separate retaining hardware, such as clips or fasteners.

In one or more arrangements, the seal mounting structure may be a grille reinforcement 19 as shown herein and mounted on a front portion of a vehicle. In other arrangements, the seal mounting structure may be a portion of the hood 18 of the vehicle. The seal 20 may be structured to seal a gap between the grille molding 16 and the hood 18 when the seal 20 is mounted to a portion of the vehicle (such as the grille reinforcement 19 or the hood 18) and the hood 18 is closed onto the seal as shown in FIG. 2B. In the embodiments shown herein, the first cavity 24c may be structured to receive a first portion 19a of the mounting structure therein and the second cavity 26c may be structured to receive a second portion 19b of the mounting structure therein, when the seal 20 is mounted on the grille reinforcement 19.

Referring to FIGS. 1-3, a sealing portion 40 may extend from the base portion 22. In one or more arrangements, the sealing portion 40 may be enclosed and generally cylindrical or tubular. The sealing portion 40 may have a resiliently deformable wall 42 defining a hollow interior 44 of the sealing portion 40. A strip of grille molding 16 may cover at least a portion of the grille reinforcement 19 and seal 20 for cosmetic purposes.

In particular arrangements, the sealing portion wall 42 may include a first sidewall 42a extending from the base portion 22 adjacent the first retaining member 24, a second sidewall 42b extending from the base portion 22 adjacent the second retaining member 26 and opposite the first sidewall 42a, and a connecting portion 42c connecting ends of the first and second sidewalls 42a, 42b. Any or all of the connecting portion 42c and the first and second sidewalls 42a, 42b may be structured to be resiliently deflectable with respect to the base portion, responsive to a force applied to the connecting portion 42c by a vehicle hood 18 moved into a closing position of the hood. Resilient deflection of the sealing portion 40 by the hood 18 provides a seal between the hood 18 and the grille molding 16 when the hood 18 is closed.

In one or more arrangements, the sealing portion 40 may be formed integrally with the base portion 22. Formation of the sealing portion 40 integrally with the base portion 22 means that the structure of the seal 20 from the base portion 22 into and along the sealing portion 40 is formed from a single, continuous, unbroken mass of material. The sealing portion 40 (or portions thereof) may be formed from the same material as the base portion 22 or from a different material. In some embodiments, the sealing portion 40 (or portions thereof) may be formed from the same material(s) as one or both of the first and second retaining members 24, 26. The particular example of FIGS. 1-2B shows a portion of the first sidewall 42a adjacent the base portion 22 formed from the same material as the base portion. Also, a portion of the second sidewall 42b adjacent the base portion 22 is shown formed from the same material as the base portion. The connecting portion 42c and other portions of the sidewalls 42a, 42b are shown as formed from a material different from that of the base portion.

Formation of the sealing portion 40 from the same material as one or more of the other portions of the seal may be achieved by, for example, extruding the sealing portion material into both the portion of the extrusion die forming the sealing portion 40 and the portion(s) of the die forming the one or more other portions of the seal (for example, into the parts of the die forming the portions of the first and/or second sidewalls 42a, 42b adjacent the base portion 22). In particular examples, at least the connecting portion 42c described herein may be formed from an EPDM material known as "EPDM Sponge" which is a closed cell sponge rubber material. The EPDM Sponge material may have a Shore durometer value in the range of 30±5 A. Where the base portion and the sealing portion 40 are formed from materials having different Shore durometers as described herein, there may be a smooth transition from a material of a first Shore durometer value to a material with a different Shore durometer value, with no gaps between the materials. In certain arrangements, the first Shore durometer value material and the other material may form intermolecular bonds in the transition region.

Referring to FIGS. 1-3, to mount the seal 20 to the grille reinforcement, the first retaining member 24 may be manipulated so as to position the first portion 19a of the mounting structure/grille reinforcement 19 in the first cavity 24c along an entire length of the seal 20. Then, a "zipping" tool may be applied to one end 20a of the seal to resiliently deflect the free end of second retaining member 26a away from the base portion 22, thereby enabling the second portion 19b of the mounting structure/grille reinforcement 19 to be positioned inside cavity 26c at the end 20a of the seal 20. The zipping tool may then be moved along the seal in direction D3, enabling the deflected portion of second retention member 26a just described to wrap around and grip second portion 19b. As the tool proceeds down the length of the seal in direction D3, this process is repeated with the tool deflecting successive portions of second retaining member 26a to enable associated portions of grille reinforcement second portion 19b to be inserted into cavity 26c. This process may continue as the tool is moved along the seal 20 in direction D3 until the tool reaches the opposite end of the seal, at which point the seal should be fully seated on the grille reinforcement.

The seal may be mounted to the hood 18 or to another portion of the vehicle in a manner similar to that just described.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A seal comprising:
   a base portion;
   a first retaining member extending from the base portion; and
   a second retaining member extending from the base portion, each of the first and second retaining members being structured to be resiliently deflectable with respect to the base portion, wherein a portion of the first retaining member extends opposite the base portion so as to define a first cavity therebetween,
   wherein a portion of the second retaining member extends opposite the base portion so as to define a second cavity therebetween, wherein the first cavity has an open side opening in a first direction toward the second cavity, and wherein the second cavity has an open side opening in a second direction toward the first cavity,
   the base portion, first retaining member, and second retaining member being structured to define a continuous void space residing opposite the base portion and extending between the portion of the first retaining member and the portion of the second retaining member, to connect the first and second cavities, and wherein the base portion is formed from a material having a first hardness, at least a portion of the first retaining member is formed from a material having a second hardness less than the first hardness, and at least a portion of the second retaining member is formed from a material having a third hardness less than the first hardness.

2. The seal of claim 1 wherein at least one of the first and second retaining members is formed integrally with the base portion.

3. The seal of claim 1 wherein the base portion is structured so as to prevent deformation of the base portion during resilient deflection of the first and second retaining members with respect to the base portion.

4. The seal of claim 1 wherein the base portion is formed from a material and at least a portion of at least one of the first retaining member adjacent the base portion and the second retaining member adjacent the base portion is formed from the same material as the base portion.

5. The seal of claim 1 wherein the base portion is formed from a material, the seal further comprising a sealing portion extending from the base portion, the sealing portion including a first sidewall extending from the base portion and a second sidewall extending from the base portion opposite the first sidewall, a portion of the first sidewall being formed exclusively from the same material as the base portion at a location where the first sidewall extends from the base portion, a portion of the second sidewall being formed exclusively from the same material as the base portion at a location where the second sidewall extends from the base portion.

6. The seal of claim 5 wherein the base portion is formed from a material and the sealing portion is formed from a material which is the same material as the base portion.

7. A seal comprising:
   a base portion formed from a material;
   a first retaining member formed integrally with the base portion and extending from the base portion so as to define a first cavity therebetween
   a second retaining member formed integrally with the base portion and extending from the base portion so as to define a second cavity therebetween and in communication with the first cavity; and
   a sealing portion extending from the base portion, the sealing portion including a first sidewall extending from the base portion and a second sidewall extending from the base portion opposite the first sidewall, a portion of the first sidewall being formed exclusively from the same material as the base portion at a location where the first sidewall connects with the base portion, a portion of the second sidewall being formed exclusively from the same material as the base portion at a location where the second sidewall connects with the base portion, and wherein the base portion is formed from a material having a first hardness, at least a portion of the first retaining member is formed from a material having a second hardness less than the first hardness, and at least a portion of the second retaining member is formed from a material having a third hardness less than the first hardness.

* * * * *